(12) United States Patent
Delph

(10) Patent No.: US 6,286,029 B1
(45) Date of Patent: *Sep. 4, 2001

(54) KIOSK CONTROLLER THAT RETRIEVES CONTENT FROM SERVERS AND THEN PUSHES THE RETRIEVED CONTENT TO A KIOSK IN THE ORDER SPECIFIED IN A RUN LIST

(75) Inventor: Daniel C. Delph, Euless, TX (US)

(73) Assignee: Sabre Inc., Fort Worth, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/840,665

(22) Filed: Apr. 28, 1997

(51) Int. Cl.[7] .................................................. G06F 15/16
(52) U.S. Cl. ......................... 709/203; 709/204; 709/217
(58) Field of Search ..................... 395/200.31, 200.32, 395/200.33, 200.36, 200.38, 200.47, 200.48, 200.49; 709/201–203, 206, 208, 217–219, 204, 205, 236

(56) References Cited

U.S. PATENT DOCUMENTS

| 4,722,005 | 1/1988 | Lendenbach | 358/168 |
| 4,974,173 | 11/1990 | Stefik et al. | 364/521 |
| 5,101,402 | 3/1992 | Chiu et al. | 370/17 |

(List continued on next page.)

FOREIGN PATENT DOCUMENTS 0 720 412 A  7/1996  (EP) .
0 753 836 A  1/1997  (EP) .

OTHER PUBLICATIONS

Sinha, Pradeep K., "Distributed Operating Systems—Concepts and Design," IEEE Press, pp. 1–16, 1997.

"Synchronous Navigation Control For Distance Learning on the Web", Ping–Jer et al., Computer Networks and ISDN Systems, vol. 28, No. 11, May 1996, pp. 1207–1218.

"Filling HTML forms Simultaneoulsy: CoWeb–Architecture and Functionality" Jacobs et al., Computer Networks and ISDN Systems, vol. 28, No. 11, May 1996, pp. 1385–1395.

"Extending WWW for Synchronous Collaboration", Frivold et al., Computer Networks and ISDN Systems, vol. 28, No. 1, Dec. 1995, pp. 69–75.

(List continued on next page.)

Primary Examiner—Zarni Maung
Assistant Examiner—Andrew Caldwell
(74) Attorney, Agent, or Firm—Finnegan, Henderson, Farabow, Garrett & Dunner, L.L.P.

(57) ABSTRACT

An intermediate server, or kiosk controller, serves as an agent between content servers and kiosk computers. A control program loaded on the intermediate server directs the intermediate server to retrieve content data from various content servers on a network. The particular content to be retrieved is specified in a run list composed of location codes. The intermediate server then automatically transmits the content to the kiosks in the sequential order specified by the run list. The kiosks' screen displays are consistently refreshed based on the transmitted content. In a specific embodiment, a kiosk controller is connected via the Internet to various web servers. The kiosk controller retrieves web pages from the various web servers. The kiosk controller modifies all links contained within the web pages to point to the kiosk computer. The kiosk controller then sends the modified web pages to kiosks running browser programs.

17 Claims, 2 Drawing Sheets

U.S. PATENT DOCUMENTS

| | | | |
|---|---|---|---|
| 5,117,225 | 5/1992 | Wang | 340/717 |
| 5,191,523 | 3/1993 | Whitesage . | |
| 5,220,655 | 6/1993 | Tsutui | 395/325 |
| 5,237,499 | 8/1993 | Garback . | |
| 5,241,625 | 8/1993 | Epard et al. | 395/163 |
| 5,311,425 | 5/1994 | Inada . | |
| 5,392,400 | 2/1995 | Berkowitz et al. | 395/200 |
| 5,440,699 | 8/1995 | Farrand et al. | 395/155 |
| 5,467,268 | 11/1995 | Sisley et al. . | |
| 5,469,183 | 11/1995 | Takatsuji et al. | 345/2 |
| 5,500,929 | 3/1996 | Dicksinson | 395/160 |
| 5,504,675 * | 4/1996 | Cragun et al. | 700/14 |
| 5,508,713 | 4/1996 | Okouchi | 345/1 |
| 5,530,852 | 6/1996 | Meske, Jr. et al. | 395/600 |
| 5,544,354 | 8/1996 | May et al. | 395/600 |
| 5,553,239 | 9/1996 | Heath et al. | 395/108.01 |
| 5,553,281 | 9/1996 | Brown et al. | 395/600 |
| 5,563,805 | 10/1996 | Arbuckle et al. | 364/514 |
| 5,570,283 | 10/1996 | Shoolery et al. . | |
| 5,572,643 | 11/1996 | Judson | 395/793 |
| 5,577,254 | 11/1996 | Gilbert | 395/615 |
| 5,577,258 * | 11/1996 | Cruz et al. | 395/200.49 |
| 5,608,874 | 3/1997 | Ogawa . | |
| 5,696,898 | 12/1997 | Baker et al. . | |
| 5,706,507 | 1/1998 | Schloss . | |
| 5,717,860 | 2/1998 | Graber et al. . | |
| 5,724,355 | 3/1998 | Bruno et al. . | |
| 5,727,159 | 3/1998 | Kikinis . | |
| 5,734,719 * | 3/1998 | Tsevdos | 380/5 |
| 5,742,762 | 4/1998 | Scholl et al. . | |
| 5,752,022 | 5/1998 | Chiu et al. . | |
| 5,754,830 | 5/1998 | Butts et al. . | |
| 5,761,071 * | 6/1998 | Bernstein et al. | 364/479.05 |
| 5,761,683 * | 6/1998 | Logan et al. | 707/513 |
| 5,774,660 * | 6/1998 | Brendel et al. | 395/200.31 |
| 5,781,909 * | 7/1998 | Logan et al. | 707/200 |
| 5,784,564 * | 7/1998 | Camaisa et al. | 709/224 |
| 5,796,945 * | 8/1998 | Tarabella | 709/219 |
| 5,802,299 * | 9/1998 | Logan et al. | 709/218 |
| 5,809,247 | 12/1998 | Richardson et al. | 709/218 |
| 5,809,250 * | 9/1998 | Kisor | 709/227 |
| 5,819,084 | 10/1998 | Shapiro et al. | 707/10 |
| 5,822,539 | 10/1998 | van Hoff | 709/230 |
| 5,826,267 * | 10/1998 | McMillan | 707/9 |
| 5,832,454 | 11/1998 | Jafri et al. . | |
| 5,835,718 | 11/1998 | Blewett | 709/218 |
| 5,848,248 | 12/1998 | Kawasaki et al. | 709/238 |
| 5,864,874 | 1/1999 | Shapiro | 707/201 |
| 5,870,546 | 2/1999 | Kirsch | 709/205 |
| 5,872,850 * | 2/1999 | Klein et al. | 380/49 |
| 5,887,170 | 3/1999 | Ansberry et al. | 709/302 |
| 5,890,172 * | 3/1999 | Borman et al. | 707/501 |
| 5,901,287 * | 5/1999 | Bull et al. | 709/218 |
| 5,909,545 | 6/1999 | Frese, II et al. | 709/208 |
| 5,944,791 | 8/1999 | Scherpbier | 709/218 |
| 5,949,411 * | 9/1999 | Doerr et al. | 345/327 |
| 5,950,173 * | 9/1999 | Perkowski | 705/26 |
| 5,956,027 | 9/1999 | Krishnamurthy | 345/329 |
| 6,009,429 | 12/1999 | Greer et al. | 707/10 |
| 6,011,537 * | 1/2000 | Slotznick | 345/115 |
| 6,034,652 * | 3/2000 | Freiberger et al. | 345/2 |
| 6,091,411 * | 7/2000 | Straub et al. | 345/333 |
| 6,101,510 * | 8/2000 | Stone et al. | 707/513 |

OTHER PUBLICATIONS

"Ubiquitous Advertising on the WWW: Merging Advertisement on the Browser", Computer Networks and ISDN Systems, vol. 28, No. 11, May 1996, pp. 1493–1499.

"Mainframes as High Volume TP Servers for the Web", D.A. Williamson, 1997 IEEE Aerospace Conference. Proceedings (Cat. No. 97CH36020), 1997 IEEE Aerospace Conference, Snowmass at Aspen, Co., Feb. 1–8, 1997, vol. 4, pp. 129–137.

"How to Put Mainframes on the Web", BYTE, Jun. 1996, McGraw–Hill, USA, vol. 21, No. 6, pp. 53–54.

"Lasting Legacy: Browsing Big Iron on the Web", Lee Bruno, Data Communications on the Web, Nov. 1996, pp. 1–8.

"Changeable Advertising Display", IBM Technical Disclosure Bulletin, vol. 40, No. 2, Feb. 1997.

"Supporting Hierarchical Guided Tours in the World Wide Web", F. J. Hauck, Computer Networks and ISDN Systems, vol. 28, No. 11, May 1996, pp. 1233–1242.

"Protect Your Company From a Net Loss of Productivity," (undated).

* cited by examiner

KIOSK CONTROLLER THAT RETRIEVES CONTENT FROM SERVERS AND THEN PUSHES THE RETRIEVED CONTENT TO A KIOSK IN THE ORDER SPECIFIED IN A RUN LIST

RELATED PATENT APPLICATIONS

This application is related to U.S. patent application Ser. No. 08/839,237, now U.S. Pat. No. 6,199,104, entitled "Server-Based Host Monitor," filed on Apr. 28, 1997, which is incorporated herein by reference as if fully set forth, and U.S. patent application Ser. No. 08/840,325, entitled "Server-Based Browser Monitor," filed on Apr. 28, 1997, which is incorporated herein by reference as if fully set forth.

TECHNICAL FIELD OF THE INVENTION

The present invention relates generally to computer networks, and more particularly, to an apparatus and method for retrieving information from a site on a network and providing that information to one or more computers.

BACKGROUND OF THE INVENTION

In recent years, computer networks have grown very popular with computer users for communicating and exchanging information. Such networks allow personal computer users to connect with each other, either directly or through a central communication point, and to exchange information by using a protocol common to each personal computer in each network. The term "Internet" has been adopted to describe the publicly available network to which virtually every personal computer in the world has access. Recent improvements in the software available for accessing and searching make the Internet a very popular source of information which can even be utilized by novices to computer technology.

Computers communicate on internet or intranet networks using a common set of standards for exchanging data known as the Transmission Control Protocol/Internet Protocol ("TCP/IP"). To initiate communication on a network, a user, known as a "client" contacts another computer on the network, known as the "server" or "host," by using various publicly available software programs. In private networks, such as corporate or business "intranets," a network protocol is usually used which allows a security system or "firewall" to keep internal data from leaving the intranet. In public networks such as the Internet, these programs use various protocols to organize information in a manner which allows the user to locate and access files of interest to the user. For instance, some files are organized by a hierarchical menu system known as the "gopher." A user can search the Internet by linking from an Internet site of interest or by entering the uniform resource locator ("URL") of the file on the gopher server which the user wants to review.

The most popular and user-friendly protocol for organizing information on the Internet has become the World Wide Web (the "WWW" or "Web"). The Web links information by associating items of interest to each other with a common TCP/IP known as the hyper text transfer protocol ("HTTP"). A Web user searches the Web by starting at the user's "home page," which is created and operated with hypertext markup language ("HTML"). From the home page, the Web user searches out and retrieves information by using "web browser" software. Web browsers allow a Web user to transfer images and texts from files of interest to the user's computer. Web browsers operate by allowing a Web user to identify a "Web link" of interest on a Web page and then execute the Web link to transfer the computer data associated with the Web link from the host computer containing that data to the Web user's computer. Web links perform this transfer of computer data by communicating the URL of the desired file to the host.

Businesses have responded to the available market of Internet users by creating a large number of Web pages which users can review. These Web pages carry a vast amount of information about businesses and the services and goods offered by businesses. Internet users can contact business through the Web pages to gain additional information about the business and, in some cases, can actually order goods and services through the Internet. Thus, the Internet has served as a beneficial means for informing the public about available goods and services and allowing businesses to advertise regarding the goods and services offered by them.

Accordingly, both Internet users and businesses would benefit from a system or method which increases the accessibility of the information which businesses place on the Internet. However, increased usage of a business's Web page requires the business to make capital investments to improve the number of Internet users who can simultaneously access the business's Web page. Further, a business gains little from advertising its Web page in hopes that an Internet user will visit the Web page as opposed to just advertising the business's goods and services outright.

Some systems do exist which facilitate the ability of a computer user to visit a variety of Internet sites in a preset or random order. For example, the Point Cast software program allows a computer user to specify a variety of information categories and sources and then directs the user's computer to display advertisements and/or snippets of the specified information categories and sources using Point-Cast's proprietary data formats, in an order controlled and biased by the PointCast software program. In some cases, the user can click on the advertisement or snippet while it is displayed and the program will connect the user to related content on a Web site via a separate browser program. Thus, in its passive mode, the PointCast user can only view partial-screen advertisements and snippets rather than full-screen Web content. Further, an advertiser has no direct control over the presentation of their advertisement or snippet as this is controlled by the PointCast software. Further, PointCast does not give an advertiser a full screen, but only a portion of a screen. Further, a user must download and install the PointCast software program on his system after which the PointCast software determines the format and order of information displayed. This arrangement makes the PointCast software program impractical for use as a commercial advertising tool controlled by an advertiser.

SUMMARY OF THE INVENTION

Therefore, a need has arisen for an apparatus or method to allow a user of a network to sequentially receive and review information from network sites.

The present invention provides an apparatus and method for sending data from network sites to a computer by sending the data through an intermediate server.

More specifically, the present invention allows an intermediate server to receive content data from a content server or sequence of content data from a plurality of content servers, and then send the content data through the network to a kiosk computer or a plurality of kiosk computers. A control program loaded on the intermediate server may operationally direct the intermediate server to retrieve content data from a plurality of content servers according to a run list that stores the location code or domain name of each content server. The control program may include instructions that direct the intermediate server to modify the content data to point back to the intermediate server, allowing the intermediate server to monitor the use of the kiosk computer. When the content servers are interfaced with the World Wide Web, advertisers can use the advanced graphics of the Web to provide attractive advertising with tremendous flexibility.

The present invention provides an important technical advantage by allowing a receiver or kiosk computer to passively receive content data from a sequence of content servers without directly contacting the content servers. Further, the kiosk computer can receive content data without requiring any special software or hardware other than that required to access the network, such as a Web browser for accessing the Web. Further, the intermediate server can provide the content data to a plurality of kiosk computers even though the intermediate server only contacts the content server once, thereby allowing the content user to increase the access to the content data without increasing the capabilities of the content server. Further, advertisers can maintain direct control over their advertisements by simply updating the network or Web site which the intermediate server contacts. Thus, an advertiser can provide full-screen flexible advertising which can fully inform the public about the advertiser's products by leading to additional Web sites.

BRIEF DESCRIPTION OF THE DRAWINGS

A more complete understanding of the present invention and the advantages thereof may be acquired by referring to the following description taken in conjunction with the accompanying drawing in which like referenced numbers indicate like features, and wherein.

DETAILED DESCRIPTION OF THE INVENTION

Preferred embodiments of the present invention are illustrated in the figures, like numerals being used to refer to like and corresponding parts of the various drawings.

The present invention uses an intermediate server as an agent between a content server or sequence of content servers and a kiosk computer or plurality of kiosk computers. A control program loaded on the intermediate server directs it to retrieve content data from one or more content servers through an interface such as a network. A network is any means of transmitting data between computers and generally entails the use of a common protocol. The control program directs the intermediate server to reference a run list of location codes, such as URL's, to determine which content data to retrieve and then facilitates the transmission of the content data to one or more kiosk computers where the content is rendered and presented on a computer screen for a predetermined period of time. When the content data comprises screen data, meaning data used in order for the kiosk computer to render a particular screen display, then the kiosk computer becomes a tool by which businesses can promote the use of their Web pages.

Figure 1:
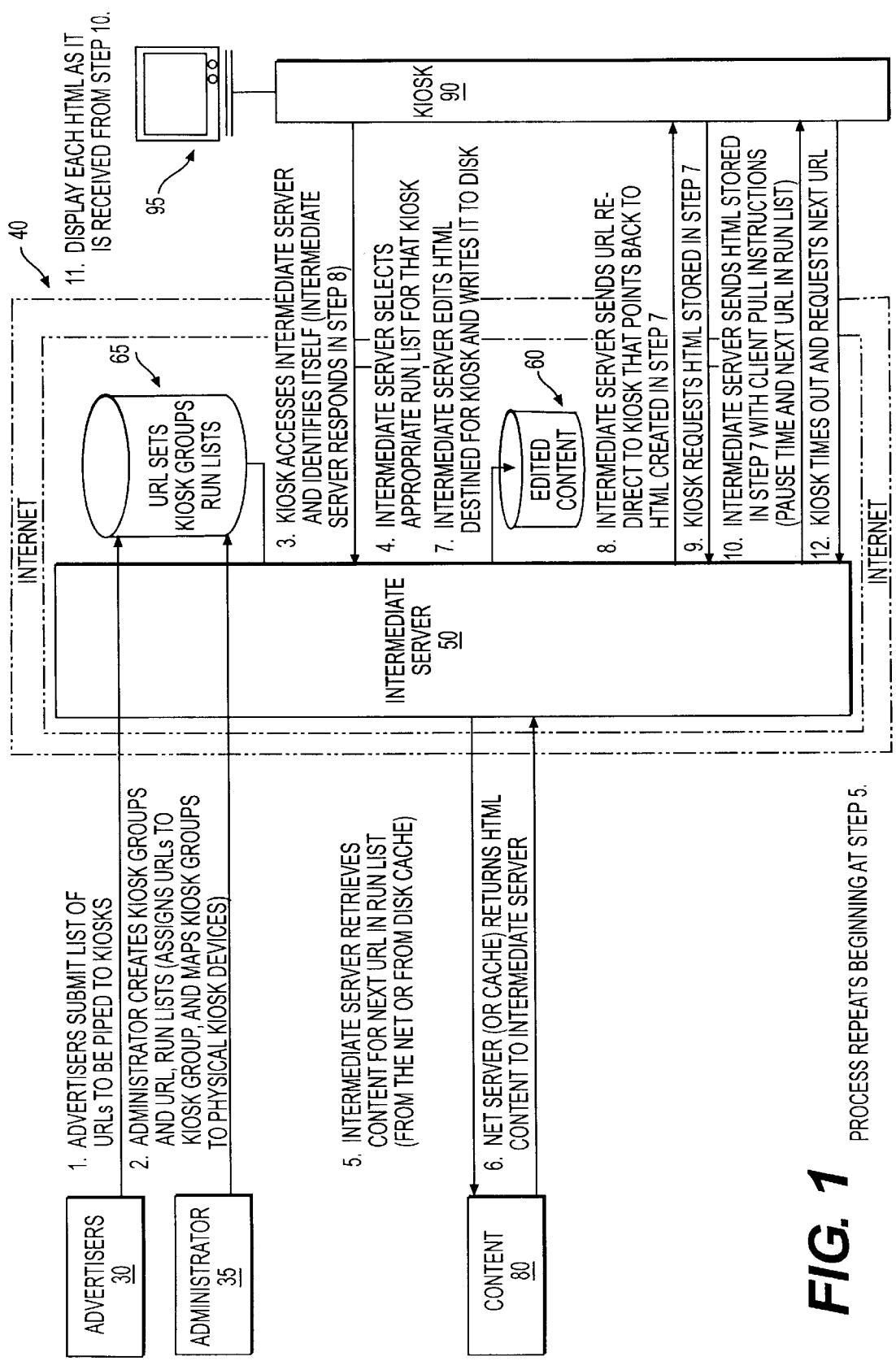
FIG. 1 shows a block diagram of one embodiment of the present invention interfaced with the Internet.

Referring now to FIG. 1, the preferred embodiment of the present invention is depicted as being interfaced with the Internet 40 by using the protocol of the World Wide Web. The term "Internet" as used herein refers to any network to which the public has access. Generally, a computer user can interface with the Internet through any telephone line or equivalent means of communication if the user's computer can implement TCP\IP or any other network compatible protocol.

An intermediate server 50 is interfaced with the Internet 40. Typically, computers that are interfaced a network as a server have a processor to operate the interface to the network and at least one local storage device. The interface itself is typically accomplished through a modem, although other means are available, such as ISDN or the high speed trunk lines which form part of the Internet.

In one embodiment, the intermediate server has a processor with at least the capability of an Intel 386 processor, which is the minimum capability generally required to efficiently run the Web's HTTP protocol. The intermediate server interfaces with the network through a modem, although any interface having the ability to receive input from at least two clients will suffice. The memory of this embodiment includes local RAM memory adequate to operate the HTTP protocol and a local storage device 60 such as a disk storage device having enough memory to store at least one Web page, although an equal amount of RAM memory will also work. A run list local storage device 65 is interfaced with intermediate server 50 and with advertiser input 30 and administrator input 35. This interface can occur through a direct connection as depicted or through an interface, such as a Web browser, of an administrator or advertiser with intermediate server 50 through the Internet 40. Alternatively, any single storage device of adequate size may be manipulated to perform the functions of local storage device 60 and run list storage device 65.

A content server 80 interfaces with intermediate server 50 through the Internet 40. Content server 80 provides content data such as screen data which allows a computer to display information on a computer monitor screen. For instance, the content data can be an HTML Web page that a content data identification code location such as a URL stores. Any server which intermediate server 50 accesses by a network may act as a content server for the present invention. This means that content server 80 includes at least one interface, the ability to use a protocol common to intermediate server 50, and some data of interest stored in an accessible memory storage device at an identifiable location, such as a Web page stored in HTML at a URL.

Kiosk computer 90 interfaces with Internet 40, thereby giving it access to intermediate server 50. Kiosk computer 90 includes at least one network interface such as a modem and the ability to use a protocol common to the protocol that intermediate server 50 uses, such as HTTP. Kiosk computer 90 need not include advanced capabilities but, in the preferred embodiment, only requires the ability to receive content data and render the content data in a usable format on kiosk monitor screen 95. Thus, kiosk computer 90 may be an inexpensive, simple Web TV, a primitive processor, or a complex device. In alternative embodiments, kiosk computer 90 interfaces with input devices such as a keyboard, mouse or credit card swipe which allows a user of kiosk computer 90 to interact through the Internet 40 with intermediate server 50, with content server 80, or with other servers accessible on the Internet 40. In yet another embodiment, an individual user or intranet can access intermediate server 50 to receive and render content data in a screen saver mode.

Advertiser input 30 and administrator input 35 interface with run list storage device 65 either through a direct input or with a Web browser through Internet 40 and intermediate server 50. Advertiser input 30 allows advertisers to identify a set of URL's representing content server data which the advertisers would like displayed on certain kiosk computers or a certain kiosk group, including the pause time for each display on each kiosk computer or group. Administrator input 35 allows an administrator of the system to manage logical kiosk groups and URL run lists, and to track system usage for billing purposes and kiosk usage.

FIG. 1 depicts steps 1–10 to illustrate the operation of the preferred embodiment of intermediate server 50 as an apparatus for sharing content data between content server 80 and kiosk computer 90. At step 1, an advertiser submits identification information such as URLs for the content data which the advertiser would like to have sent to kiosk computer 90. The advertiser can submit this list through an interface with the Internet or by any means which allows the administrator of the system to input the identification codes into the run list storage device 65. At step 2, the administrator identifies kiosks such as kiosk 90 and provides a run list of content data for each kiosk to receive, such as a list of URLs for a given set of content data. The administrator further provides a pause time for each set of content data to be displayed on each kiosk computer.

At step 3, kiosk computer 90 accesses intermediate server 50 with a standard Web browser and provides kiosk identification information. Kiosk computer 90 may access intermediate server 50 by a kiosk user setting up the kiosk or may have the location name of intermediate server 50 programmed in a boot-up routine which directs kiosk computer 90 to automatically access intermediate server 50.

At step 4, an associative control program directs the intermediate server 50 to correlate the kiosk identification information to a kiosk group and retrieves the run list of desired content data for the kiosk computer associated with the kiosk identification information.

At step 5, the control program directs intermediate server 50 to retrieve the content data associated with the first content data identification code in the run list. In the preferred embodiment, as shown at step 6, intermediate server 50 uses a Web browser to retrieve an HTML Web page from a URL on content server 80 through the interface with the Internet 40. However, other ways of identifying and receiving content data of interest may be used.

At step 7, the control program directs intermediate server 50 to modify the content data and store the content data on local storage device 60. In one embodiment, the content data comprises a Web page having Web links and associated graphics. Intermediate server 50 may modify the content data by replacing the Web links with modified Web links. The modified Web links comprise the original Web links appended to the location code of intermediate server 50. In this way, if a user of a kiosk computer receives and activates a modified Web link, the modified Web link will direct the user's computer to contact intermediate server 50, which will then use the appended Web link to retrieve the associated content data. Alternatively, the intermediate server can present unmodified Web links for the kiosk user to activate.

At step 8, a re-direct program loaded on intermediate server 50 directs it to create and send a modified content data identification code to kiosk computer 90. The modified content data identification code comprises the original code appended to the location code of intermediate server 50.

At step 9, a Web browser on kiosk computer 90 receives the re-direct code and accordingly requests the HTML data stored at step 7. In alternative embodiments, the re-direct program can use other means of identifying appropriate content data and sending that content data to kiosk computer 90. However, by using a Web browser, kiosk computer 90 can request HTML data using a typical Web browser and without any system-specific software.

At steps 10 and 11, intermediate server 50 provides kiosk computer 90 with the modified content data and with standard HTTP client pull instructions to direct kiosk computer 90 to the sequential URL or other identification from the run list. The client pull instructions include a pause time to define the period of time which kiosk computer 90 will display content data on kiosk monitor screen 95, and also includes the sequential content data identification code such as the next URL in the run list. At step 12 after the pause time has expired, the Web browser of kiosk computer 90 requests the sequential content data identification code of the client pull instructions. Intermediate server 50 then goes back to step 5 to retrieve the content data correlated with the sequential content identification code. In this manner, intermediate server 50 proceeds through the predetermined sequence of content identification codes initially retrieved from run list storage device 65. A loop of requested content data is created and continued until interrupted by a user input or otherwise. In one embodiment, the intermediate server 50 stores content data in local storage, such as local cache, and provides the stored data to subsequent URL requests from kiosk computers. In this way, intermediate server 50 can reduce the number of contacts made over the Internet 40 with content server 80, and can provide data to kiosk computer 90 with little delay.

Figure 2:
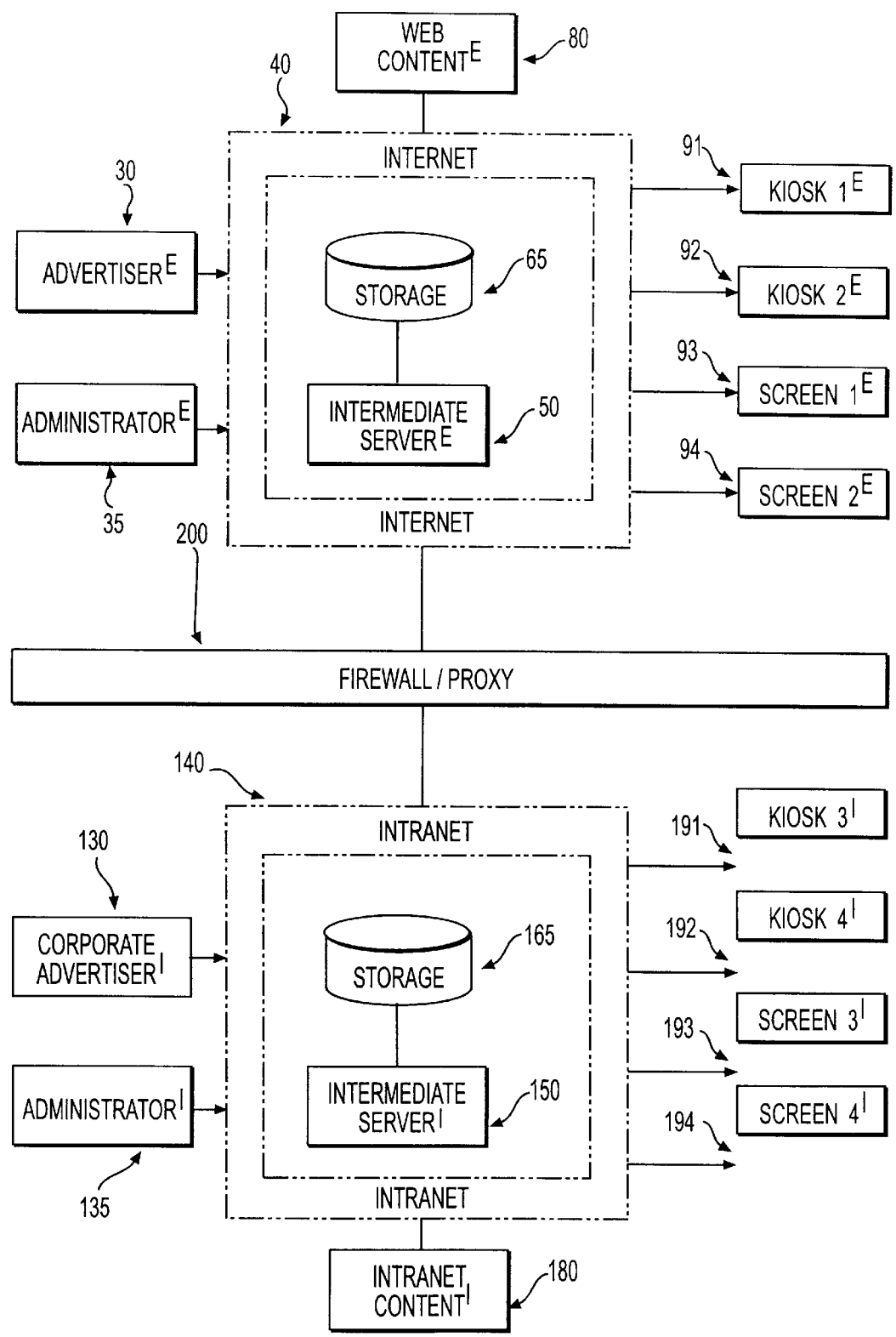
FIG. 2 shows one embodiment of the present invention used on the Internet and also on an intranet.

Referring now to FIG. 2, several embodiments of the present invention are illustrated. An intermediate server 150 is interfaced to intranet 140. Intranet 140 has limited access and is protected by a security system firewall 200 which prevents unauthorized access to intranet 140. Content server 180 and kiosk computers 191 and 192 are interfaced to intranet 140. An advertiser input 130 submits a run list to intermediate server 50, and an administrator input 135 creates kiosk groups and correlates the groups to an appropriate run list stored in run list local storage device 165. For instance, kiosk computer 193 and kiosk computer 194 are grouped in a kiosk group that receives content data specified by a first run list. Kiosk computer 191 and kiosk computer 192 belong to a kiosk group that receives content data according to a second run list. Thus, the control program on intermediate server 150 directs it to retrieve content data according to the first and second run lists and send the content data to the first and second kiosk groups, respectively.

FIG. 2 also depicts intermediate server 50 as interfacing with Internet 40 and content server 80 as set forth in FIG. 1. As described in the intranet, intermediate server 50 provides content data to a first kiosk group comprising a plurality of kiosk computers depicted as kiosk computer 93 and kiosk computer 94. Intermediate sever 50 also provides content data to a second kiosk group according to a second run list, the second kiosk group comprising kiosk computer 91 and kiosk computer 92. Intermediate servers 50 and 150 provide content data to a plurality of kiosk computers in the same way that a Web page can be accessed by a plurality of computers. However, firewall 200 prevents kiosk computers outside the firewall from receiving content data from the intranet. Thus, intermediate server 150 can only service kiosks behind the firewall 200, such as kiosk 191; however, intermediate server 50 can service kiosks that reside on both sides of firewall 200 as long as kiosks behind firewall 200 have access to Internet 40.

In operation, the present invention allows kiosk computers located in public places to receive and display content data stored on the Internet sites of selected businesses. The kiosk computer displays the content data in a sequential manner until a user makes an input into the kiosk computer. For instance, if a traveler passing through an airport sees a product of interest on a kiosk computer displaying the home page of ABC Company, the user can select a Web link to ABC Company to receive additional information about the product of interest. The user can navigate the Internet to related Web sites using the modified Web links. Each activation of a modified Web link points to the intermediate server, which retrieves the requested content data and modifies the data before passing the data to the kiosk computer. After the user stops making inputs to the kiosk computer for a given time, the kiosk computer returns to the run list to display the sequential content data according to the run list of its kiosk group.

In an alternative embodiment, a corporation can treat computers interfaced with its intranet as kiosks, and flash corporate news items. Essentially, the content data acts as a screen saver which the corporate user can deactivate to use his computer for other purposes. Similarly, an Internet user could use the present invention as both a screen saver and a means of discovering new Internet sites.

The present invention allows a business to effectively use a Web site to advertise goods and services and to provide a vast supply of information to potential customers without a significant capital investment. The advertiser can maintain complete control over the screen rendered on kiosk computers, and can thus update advertisements on a real time basis. Further, the present invention can turn individual computers located in residences, businesses or behind corporate firewalls into kiosks by providing a screen saver service that both informs the public about information available on the Web and gets an advertiser's message out.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. An apparatus for sharing content data with a kiosk computer through a network, the apparatus comprising:
   a plurality of content servers interfaced with the network, the content servers each having content data;
   a kiosk computer interfaced with the network;
   an intermediate server interfaced with the network that controls the kiosk computer;
   run list storage device interfaced with the intermediate server, the run list storage device storing a run list that represents a sequential order of content data associated with the content servers that is to be sent to the kiosk computer; and
   a control program loaded on the intermediate server that prevents the kiosk computer from directly accessing the content servers, the control program operationally directing the intermediate server to:
      retrieve the run list stored in the run list storage device;
      retrieve the content data from each content server based on the run list; and
      automatically transmit the content data of each content server, in the sequential order, to the kiosk computer, wherein a screen display of the kiosk computer is consistently refreshed based on the transmitted content data.

2. The apparatus according to claim 1 further comprising a plurality of kiosk computers, each said kiosk computer being interfaced with the network; and
   wherein said control program operationally directs said intermediate server to send the content data to each said kiosk computer.

3. The apparatus according to claim 1 further comprising a plurality of kiosk computers, each said kiosk computer being interfaced with the network; and
   wherein said control program operationally directs said intermediate server to send the content data to each said kiosk computer in the sequential order.

4. The apparatus according to claim 1 wherein the network is the Internet, and the content data is comprised of at least one Web page stored on each content server.

5. The apparatus according to claim 4 further comprising an input device interfaced with one or more said kiosk computers.

6. The apparatus according to claim 5 wherein:
   the Web page includes a Web link; and
   said control program directs said intermediate server to modify the Web link into modified Web links pointing to said intermediate server.

7. An apparatus for sharing content data with a kiosk computer through a network, the apparatus comprising:
   a plurality of content servers interfaced with the network, each of the content servers having content data stored at a content identification code;
   an intermediate server interfaced with the network that controls the kiosk computer, the intermediate server having a location name and having a local storage device, the local storage device storing a run list comprising a first content identification code and at least one sequential content identification code stored in a predetermined order;
   a kiosk computer interfaced with the network;
   a control program loaded on the intermediate server such that the intermediate server prevents the kiosk computer from directly accessing the content server, the control program directing said intermediate server to:
      receive information identifying the content servers from which the content data should be retrieved;
      retrieve the content data from the content server;
      automatically transmit the content data to the kiosk computer and consistently refresh a screen display of the kiosk computer.

8. The apparatus according to claim 7 wherein:
   said local storage device further stores a pause time corresponding to each content identification code; and
   said control program further directs said intermediate server to send client pull instructions to said kiosk computer, the client pull instructions comprising the pause time corresponding to the content data and the sequential content identification code.

9. The apparatus according to claim 7 wherein:
   the content data comprises screen data and linking data; and
   said control program directs said intermediate server to:
      modify the linking data into modified linking data comprising the linking data appended to the location name of said intermediate server; and
      substitute the modified linking data for the linking data in the content data sent to said kiosk computer.

10. The apparatus according to claim 9 further comprising an input device interfaced with said kiosk computer.

11. The apparatus according to claim 10 wherein said input device can activate the modified linking data, the modified linking device directing said control program to retrieve content data corresponding to the modified linking device.

12. The apparatus according to claim 9 further comprising a plurality of kiosk computers interfaced with the network; and wherein said local storage device stores a run list and pause time for each said kiosk computer, and said control program further directs said intermediate computer to:
retrieve content data for each run list;
modify content data for each run list;
send modified content data and client pull instructions to each kiosk computer.

13. A method for showing computer data with kiosk computers through a network, the method comprising the steps of:

interfacing a plurality of content servers, an intermediate server and a kiosk computer with a network, each content server having content data; and directing, under control of a program stored in the intermediate server, the intermediate server to:
retrieve a run list from a run list storage device, wherein the run list represents a sequential order of content data associated with the content servers that is to be sent to the kiosk computer,
retrieve content data from each one of the content servers according to the run list, and
automatically transmit the retrieved content data to the kiosk computer in the sequential order, allowing a predetermined time period to pass between each transmission of the retrieved content.

14. The method according to claim 13 further comprising the steps of:

interfacing a plurality of kiosk computers to the network;
directing the intermediate server to transmit the content data to each kiosk computer; and
directing the intermediate server to store usage information reflecting the transmission of the content data to the kiosk computers.

15. The method according to claim 13 wherein the network comprises the Internet and the content data comprises a Web page.

16. An apparatus for sharing data through a network between a kiosk computer and a plurality of content servers, each content server having content data, the apparatus comprising:

an intermediate server interfaced with the network that controls the kiosk computer; and a control program loaded on the intermediate server such that the intermediate server prevents the kiosk computer from directly accessing the plurality of content servers, the control program operationally controlling the intermediate server to:
retrieve a run list from a run list storage device, wherein the run list represents a sequential order of content data associated with the content servers that is to be sent to the kiosk computer,
retrieve the content data from each one of the content servers according to the run list; and
automatically transmit the retrieved content data to the kiosk computer in the sequential order, allowing a predetermined time period to pass between each transmission of the retrieved content data.

17. The apparatus of claim 16 wherein the intermediate server is interfaced with a plurality of kiosk computers, and wherein the control program operationally controls the intermediate server to send the content data to each of the kiosk computers in a sequential order.

* * * * *

UNITED STATES PATENT AND TRADEMARK OFFICE
CERTIFICATE OF CORRECTION

PATENT NO. : 6,286,029 B1
DATED : September 4, 2001
INVENTOR(S) : Daniel C. Delph It is certified that error appears in the above-identified patent and that said Letters Patent is hereby corrected as shown below:

<u>Column 7, claim 1,</u>
Line 51, before "run list storage device", insert -- a --.

Signed and Sealed this

Twenty-sixth Day of February, 2002

*Attest:*

*Attesting Officer*

JAMES E. ROGAN
*Director of the United States Patent and Trademark Office*